No. 672,281. Patented Apr. 16, 1901.
R. R. MORRISON.
APPARATUS FOR MAKING GLASS CYLINDERS.
(Application filed July 25, 1900.)
(No Model.)
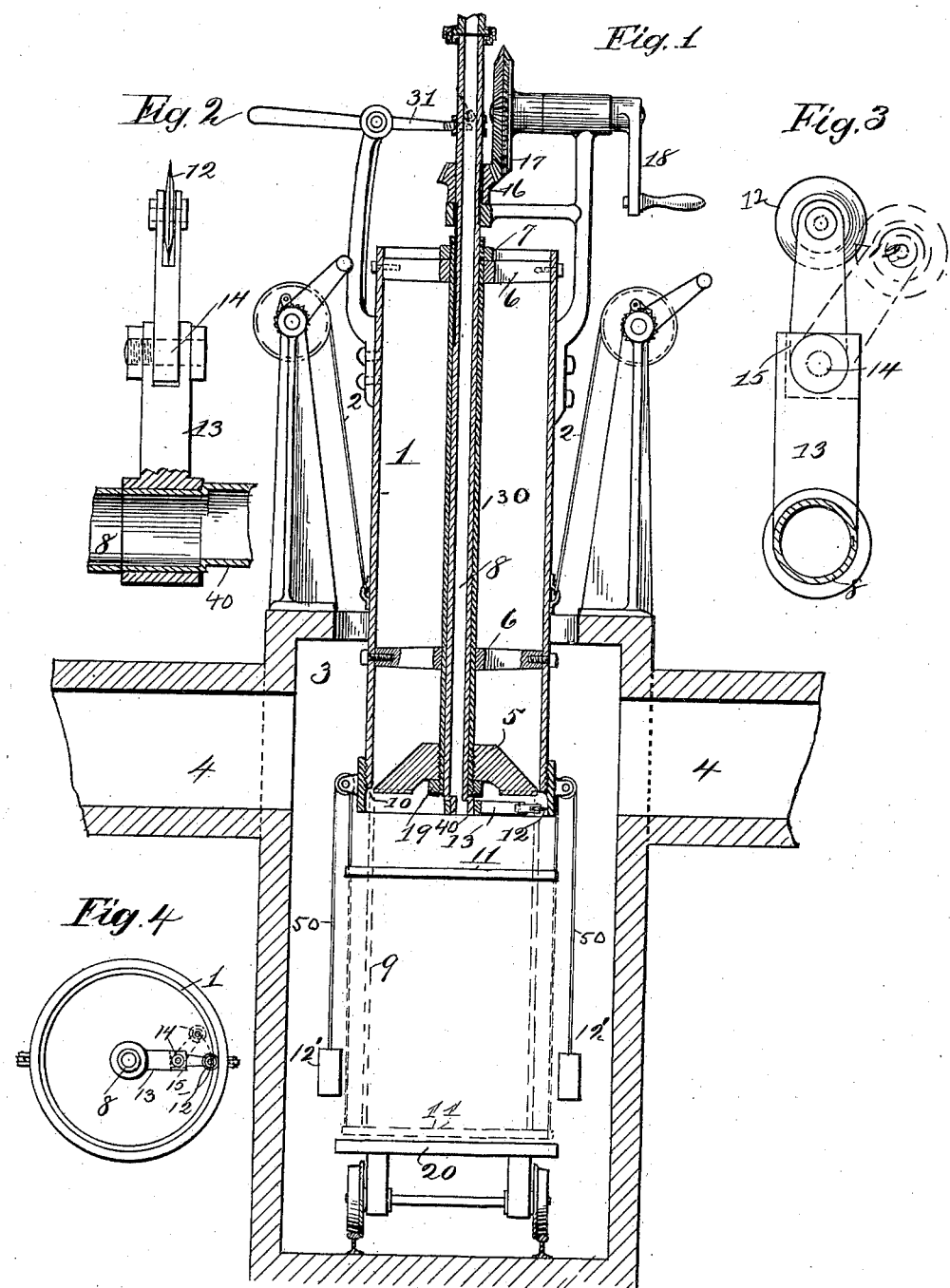
Witnesses
Percy E. Neville
Ruby M. Browne
Inventor
Reason R. Morrison
by Wm. M. Monroe
Attorney

UNITED STATES PATENT OFFICE.

REASON R. MORRISON, OF MINERALPOINT, OHIO.

APPARATUS FOR MAKING GLASS CYLINDERS.

SPECIFICATION forming part of Letters Patent No. 672,281, dated April 16, 1901.

Application filed July 25, 1900. Serial No. 24,839. (No model.)

*To all whom it may concern:*

Be it known that I, REASON R. MORRISON, a citizen of the United States, and a resident of Mineralpoint, county of Tuscarawas, State of Ohio, have invented certain new and useful Improvements in Apparatus for Making Glass Cylinders, of which I hereby declare the following to be a full, clear, and exact description, such as will enable others skilled in the art to which it appertains to make and use the same.

My invention relates to improvements in apparatus for making glass tubes; and the objects of the invention are to provide means for forming the pipe or tube of exact and regular diameter throughout and for maintaining it in even proportions until cooled and its outlines permanently fixed.

My invention consists in the combination and arrangement of parts and construction of details, as hereinafter described, exemplified in the drawings, and pointed out in the claims.

In the accompanying drawings, Figure 1 is a vertical sectional view of the device. Figs. 2 and 3 are detail views of the glass-cutter enlarged from Fig. 1, and Fig. 4 is a plan view of the bottom of the casting-cylinder.

In the views, 1 is a cylinder to hold molten glass, supported adjustably by means of cords or chains 2, so that its lower extremity will extend into the chamber or well 3, through the upper portion of which extends the flue 4 of a furnace, by means of which the lower portion of the cylinder is maintained at the proper degree of heat for running the metal. At the bottom of the cylinder is seen the movable head 5, of the same or practically the same diameter as the cylinder and adjustable, so as to shut off the flow of glass. This head is supported directly upon the sleeve 30, which moves freely up and down in the central hubs of spiders 6, fixed within the cylinder 1. A nut 7 upon the screw-threaded extremity of the sleeve rests upon the upper spider-hub, and by turning the nut the sleeve and attached head can be raised and lowered. Some device is necessary to raise the sleeve quickly, so as to shut off the supply of glass. This is done by means of the inner tube 8, which is provided with an offset 40 at its lower extremity, which passes underneath the sleeve 30. A lever 31, pivoted at the upper extremity of the cylinder, is used to raise the inner tube, and thereby the sleeve and attached head. 8 is also a central tube, by means of which an air-current is driven into the glass-cylinder (shown in dotted lines) at 9 and by means of which the glass is maintained in shape until cooled. The melted glass passing through the annular opening 10 between the head and cylinder cools and drops down upon the movable platform 11, which is so balanced by weights 12' as to move slowly downward as weight is added to the glass-cylinder. The air in the meantime entering the tube 8 cools the glass and by its pressure prevents it from falling in. When the glass-cylinder is completed, the finished portion is cut off from the still soft metal issuing from the opening 10 either by the closing of the core or by means of the roller-cutter 12, pivoted upon the arm 13, which is jointed at 14, so as to be movable only in one direction, while a shoulder 15 prevents its moving in the other direction. This cutter-arm is secured to the lower extremity of the air-tube 8 and is rotated by means of gears 16 and 17 and winch-handle 18.

It will be seen that when quickly rotated in one direction the roller will be pressed against the glass and will cut it off; but when rotated in the other direction the arm 13 will fly back, as shown in dotted lines in Fig. 4, and will remove the cutter entirely from the glass. In this position the glass can be poured without touching the cutter.

The cylinder which holds the molten glass can be supported in any desirable manner by weights or winches, so that it can be raised above the well 3 for adjustment of the bottom, which is held in place by the nut 19. By means of nuts 7 and 19 the width of the annular opening 10 can be increased or diminished to vary the thickness of the glass tubes, as described.

In use the cylinder 1 is filled with molten glass, which is maintained sufficiently hot to flow through the opening 10 by means of the furnace blast through the flue 4. As the glass tube descends it rests upon the platform 11 and is cooled by the air from the central tube and when fully extended is cut off and placed upon the carrier 20, on which it is removed.

Any convenient hoisting device can be employed, if desired, to assist the weights 12' in supporting and raising the glass-cylinder. The weights 12' are directly attached to the platform 11 by means of cords or chains 50. When lowered, the car 20 receives the glass, and upon it the glass is removed from the furnace.

Windlasses or levers or other equivalent devices may be employed to raise any of the parts.

Having described my invention, what I claim as new, and desire to secure by Letters Patent, is—

1. In a device for making glass tubes the combination with a vertically-placed cylinder and furnace, of spiders within the cylinder, a sleeve vertically movable in the hubs of said spiders, a head of practically the same diameter as the cylinder secured to said sleeve, a central tube within the sleeve provided with an offset at the bottom upon which said sleeve rests, a hinged cutter secured to the lower extremity of the central tube, means for rotating the tube and cutter and for raising simultaneously the tube, sleeve and head, and for raising the cylinder out of the furnace, substantially as described.

2. In a device of the character described a vertical cylinder adapted to contain the molten glass, and provided with spiders secured therein, a sleeve mounted centrally upon said spiders and vertically movable therein, a head of corresponding diameter to the cylinder mounted at the lower extremity of the sleeve, a central tube provided with an offset under the sleeve, means for lifting the tube and therewith the sleeve and head, a hinged cutter-bar secured transversely to said offset on the tube, and a cutter therein, and means for rotating the inner tube in either direction, substantially as described.

3. In a device for the purpose described, a cylinder to contain molten metal a head vertically movable therein and of the same diameter, and a hinged cutter-arm provided with a rotary cutter, secured underneath said head, and constructed and arranged to throw the cutter into engagement with the glass when rotated in one direction and throw it out of engagement therewith when rotated in the other direction, substantially as described.

4. The combination with a cylinder, a head therein of the same diameter, a central air-tube, and a hinged cutter-bar upon said tube, substantially as described.

In testimony whereof I have signed my name to this specification in the presence of two subscribing witnesses.

REASON R. MORRISON.

Witnesses:
E. C. ANDERSEN,
F. O. RICHMOND.